United States Patent
Frenzel et al.

(10) Patent No.: US 11,534,808 B2
(45) Date of Patent: Dec. 27, 2022

(54) TARGETED ADJUSTING OF THE CONTOUR USING CORRESPONDING SPECIFICATIONS

(71) Applicant: Primetals Technologies Germany GmbH, Erlangen (DE)

(72) Inventors: Jens Frenzel, Hagen (DE); Christopher Gusek, Iserlohn (DE); Matthias Kurz, Erlangen (DE); Marco Miele, Erlangen (DE); Friedemann Schmid, Erlangen (DE); Alexander Thekale, Erlangen (DE); Martin Vogt, Iserlohn (DE)

(73) Assignee: PRIMETALS TECHNOLOGIES GERMANY GMBH

( * ) Notice: Subject to any disclaimer, the term of this patent is extended or adjusted under 35 U.S.C. 154(b) by 0 days.

(21) Appl. No.: 16/760,912

(22) PCT Filed: Sep. 24, 2018

(86) PCT No.: PCT/EP2018/075807
§ 371 (c)(1),
(2) Date: May 1, 2020

(87) PCT Pub. No.: WO2019/086172
PCT Pub. Date: May 9, 2019

(65) Prior Publication Data
US 2021/0178443 A1 Jun. 17, 2021

(30) Foreign Application Priority Data
Nov. 6, 2017 (EP) .................................. 17200046

(51) Int. Cl.
*B21B 37/28* (2006.01)
*G05B 19/00* (2006.01)
*G05B 19/418* (2006.01)

(52) U.S. Cl.
CPC .............. *B21B 37/28* (2013.01); *G05B 19/00* (2013.01); *G05B 19/41815* (2013.01);
(Continued)

(58) Field of Classification Search
CPC . B21B 37/28; B21B 2263/02; B21B 2263/08; B21B 2263/12
See application file for complete search history.

(56) References Cited

U.S. PATENT DOCUMENTS

| 5,651,281 A | * | 7/1997 | Seidel | ..................... B21B 37/28 72/11.8 |
| 6,098,060 A | | 8/2000 | Yuan et al. | ..................... 706/26 |

(Continued)

FOREIGN PATENT DOCUMENTS

| EP | 1 481 742 A2 | 12/2004 |
| JP | S62-238012 A | 10/1987 |

(Continued)

OTHER PUBLICATIONS

International Search Report dated Mar. 15, 2019 in corresponding PCT International Application No. PCT/EP2018/075807.
(Continued)

*Primary Examiner* — Adam J Eiseman
*Assistant Examiner* — P Derek Pressley
(74) *Attorney, Agent, or Firm* — Ostrolenk Faber LLP

(57) ABSTRACT

Prior to the rolling of a flat rolling material (2) on a rolling line that includes a number of roll stands (1), a control system (3) receives actual variables (I) and target variables (Z) of the material (2). The control system (3) determines desired values (S*) for the roll stands (1), based on the actual (I) and target variables (Z) in combination with a model (10) of the rolling line, such that expected variables (E1) of the material (2) after its rolling are aligned as far as possible with the target variables (Z) and transfers the desired values
(Continued)

(S*) to the roll stands (1) such that the material (2) is rolled according to the desired values (S*). The target variables (Z) comprise at least one freely selectable, discrete characteristic variable (K1 to K5, K2' to K4', K2" to K4") defining the contour (K) of the flat rolling material (2).

8 Claims, 5 Drawing Sheets

(52) U.S. Cl.
CPC ....... *B21B 2263/02* (2013.01); *B21B 2263/08* (2013.01); *B21B 2263/12* (2013.01); *G05B 2219/37398* (2013.01); *G05B 2219/37402* (2013.01)

(56) References Cited

U.S. PATENT DOCUMENTS

| | | | |
|---|---|---|---|
| 7,031,797 B2 | 4/2006 | Reinschke et al. | 700/150 |
| 2005/0125091 A1* | 6/2005 | Reinschke | B21B 37/28 700/148 |
| 2009/0249849 A1* | 10/2009 | Martin | B21B 37/28 72/9.1 |

FOREIGN PATENT DOCUMENTS

| | | |
|---|---|---|
| JP | H03-243206 A | 10/1991 |
| WO | WO 95/19591 A1 | 7/1995 |
| WO | WO 03/078086 A1 | 9/2003 |
| WO | WO 2006/132585 A1 | 12/2006 |
| WO | WO 2011/038964 A1 | 4/2011 |

OTHER PUBLICATIONS

Written Opinion dated Mar. 15, 2019 in corresponding PCT International Application No. PCT/EP2018/075807.
European Search Report dated May 9, 2018 in corresponding European Patent Application No. 17200046.5.
Japanese Notice of Allowance, dated Jun. 27, 2022, issued in corresponding Japanese Patent Application No. 2020-524647.

* cited by examiner

TARGETED ADJUSTING OF THE CONTOUR USING CORRESPONDING SPECIFICATIONS

CROSS-REFERENCE TO RELATED APPLICATIONS

The present application is a 35 U.S.C. §§ 371 national phase conversion of PCT/EP2018/075807, filed Sep. 24, 2018, the contents of which are incorporated herein by reference, which claims priority of European Patent Application No. 17200046.5 filed Nov. 6, 2017, the contents of which are incorporated by reference herein. The PCT International Application was published in the German language.

FIELD OF TECHNOLOGY

The present invention relates to an operating method for a rolling line comprising a number of roll stands for rolling a flat rolling material,
wherein prior to the rolling of the flat rolling material in the rolling line, a control system of the rolling line receives actual variables of the flat rolling material before the rolling of the flat rolling material in the rolling line and target variables of the flat rolling material after the rolling of the flat rolling material in the rolling line,
wherein the control system determines desired values for control variables for the roll stands of the rolling line, based on the actual variables of the flat rolling material and the target variables of the flat rolling material, in combination with a description of the rolling line, using a model of the rolling line,
wherein the control system determines the desired values for the control variables in such a way that expected variables for the flat rolling material after the rolling of the flat rolling material in the rolling line are aligned as far as possible with target variables,
wherein the control system transfers the desired values to the roll stands of the rolling line, such that the flat rolling material is rolled in the rolling line according to the transferred desired values.

The present invention further relates to a computer program comprising machine code which can be executed by a control system for a rolling line for rolling a flat rolling material, wherein the execution of the machine code by the control system causes the control system to operate the rolling line in accordance with such an operating method.

The present invention further relates to a control system for a rolling line for rolling a flat rolling material, wherein the control system is designed as a software-programmable control system and is programmed by such a non-transitory computer program, so that it operates the rolling line in accordance with such an operating method.

The present invention further relates to a rolling line for rolling a flat rolling material,
wherein the rolling line has a number of roll stands by means of which the flat rolling material is rolled,
wherein the rolling line has such a control system.

PRIOR ART

The subject matter cited above is disclosed in WO 03/078 086 A1, for example.

In addition to the profile and the flatness, the contour of a flat rolling material, i.e. the course of the thickness of the flat rolling material as a function of the location viewed in a width direction of the flat rolling material, is a key variable of the flat rolling material. The contour is influenced by the rolling process. If contours that are not sufficient for the intended further processing are produced when the flat rolling material is rolled, this usually results in financial disadvantages. This applies equally to the usual case in which the flat rolling material is designed as a strip and to the case in which the flat rolling material is designed as a heavy plate.

In comparatively favorable cases, it is merely necessary to undertake finishing of the flat rolling material. In other cases, the flat rolling material cannot be supplied for the intended further processing, but must be supplied for another use which is generally of lower value. In many cases, the flat rolling material cannot be utilized at all and is consequently scrap. The specialist will therefore always endeavor to achieve sufficiently good contours when rolling the flat rolling material.

The prior art discloses various control elements (actuators) for influencing the contour. Typical control elements include roll bending, reverse displacement of working rolls or intermediate rolls in the direction of their roll axes, swiveling, so-called pair crossing, and location-dependent temperature control of the flat rolling material or corresponding points of the working rolls locally over the width of the flat rolling material.

The profile value is a discrete characteristic variable of the contour. The profile value is a scalar. It designates the difference between the thickness of the flat rolling material in the center of the flat rolling material and the thickness of the flat rolling material in the vicinity of the border of the flat rolling material. The profile value is usually designated as Cxx, where xx specifies the distance from the border of the flat rolling material in millimeters. The profile value is therefore derived from the contour at three points, specifically the thickness in the center of the flat rolling material and the average of the thickness in the vicinity of the two borders of the flat rolling material.

The prior art usually only specifies the profile value. The contour itself is not specified, however. The specification of the profile value corresponds to the specification of a symmetrical parabola corresponding to the profile value. In the prior art, the profile value is controlled by means of a so-called PFC algorithm (PFC=profile and flatness control).

However, the contour does not just have the profile value, but a plurality of further discrete characteristic variables. These discrete characteristic variables comprise—in addition to the profile value of the flat rolling material—at least one edge value, at least one dogbone value, at least one edge drop value and/or a taper value.

The edge value describes a so-called "thick edge" of the flat rolling material, meaning that the flat rolling material has a greater thickness towards the border than further inwards. The dogbone value is defined in a similar manner to the edge value. The difference is that in the case of the dogbone value the thickness in the vicinity of the borders of the flat rolling material is compared with the thickness of the flat rolling material directly in the center of the flat rolling material. The edge drop value specifies the extent to which the thickness of the flat rolling material drops in the immediate vicinity of the border. The taper value is a measure of the asymmetry of the flat rolling material viewed in a width direction of the flat rolling material.

SUMMARY OF THE INVENTION

The object is achieved by an operating method having the features in claim 1. Advantageous embodiments are specified in the dependent claims 3 to 6.

According to the invention, an operating method of the type cited in the introduction is embodied such that the control system receives any of a plurality of discrete characteristic variables it receives, and that the discrete characteristic variables define the contour of the flat rolling material and comprise at least one profile value, at least one edge value for a thick edge, at least one dogbone value for a dogbone, at least one edge drop value for an edge drop and/or at least one taper value for a thickness taper.

It is therefore not only possible to stipulate which numerical value is received by the control system as the discrete characteristic variable defining the contour of the flat rolling material. This is always determined by the circumstances of the particular case. It is also not only possible for the developer or programmer, in the context of the development or programming of the control system, to stipulate which discrete characteristic variable defining the contour of the flat rolling material can be specified, a later specification of this discrete characteristic variable is therefore stipulated. Rather, it is possible for the person or the entity specifying the target variables of the control system to stipulate what type of discrete characteristic variable is received by the control system. The person or entity specifying the target variables of the control system can therefore stipulate not only the value to which the characteristic variable defining the contour of the flat rolling material discrete should be adjusted, but can also stipulate whether the specified target variable is e.g. a profile value, an edge value for a thick edge, a dogbone value for a dogbone, an edge drop value for an edge drop and/or a taper value for a thickness taper. In particular, if the specified discrete characteristic variable is a profile value, it is therefore possible not only to stipulate the distance from the border for which the profile value is defined, but it can also be stipulated that a profile value is specified at all. If applicable, the operator or the entity can specify not just a single characteristic variable, but also a plurality of these discrete characteristic variables.

According to a preferred embodiment,
the control system captures the control variables during rolling of the flat rolling material,
after the rolling of the flat rolling material, the control system captures, or determines on the basis of captured variables, the at least one discrete characteristic variable,
the control system re-determines expected variables which are expected for the flat rolling material after the rolling of the flat rolling material in the rolling line, based on the actual variables of the flat rolling material and the captured control variables, using the model of the rolling line for the flat rolling material,
the control system compares the re-determined expected variables with the at least one freely selectable discrete characteristic variable defining the contour of the flat rolling material, and
the control system corrects the model of the rolling line on the basis of the comparison.

It is thereby possible more effectively to determine the desired values for the control variables for flat rolling materials, of the same type, which will be rolled after the flat rolling material that is currently being rolled. This procedure can be realized irrespective of whether the flat rolling material is a strip or a heavy plate. The capture of the contour can be effected directly and automatically using measurement technology. This is possible in particular if the contour is captured behind the last roll stand of the rolling line. Alternatively, it is also possible to determine the contour on the basis of other measured variables in a model-based manner (so-called soft sensor). Prior determination based on the captured or determined contour is required in order to utilize the discrete characteristic variables.

According to a further preferred embodiment,
during the rolling of the flat rolling material, the control system captures, or determines on the basis of captured variables, the at least one discrete characteristic variable for previously rolled sections of the flat rolling material,
the control system compares the at least one discrete characteristic variable with the target variables and
the control system corrects the desired values for the control variables for the roll stands on the basis of the comparison.

It is therefore already possible when rolling the flat rolling material to effect a correction for subsequently rolled sections of the flat rolling material. This procedure can be realized in particular if the flat rolling material is a strip. As before, the contour can be captured directly and automatically using measurement technology or determined by soft-sensor means. As before, prior determination based on the captured or determined contour is required in order to utilize the discrete characteristic variables.

The control system preferably determines the desired values for the control variables by optimizing a cost function, into which is entered a deviation of the expected variables for the flat rolling material after the rolling of the flat rolling material in the rolling line from the target variables of the flat rolling material. Since the cited target variables comprise in particular the at least one freely selectable discrete characteristic variable defining the contour of the flat rolling material, the at least one discrete characteristic variable is therefore also included in the cost function.

When determining the desired values for the control variables, the control system preferably takes into consideration secondary conditions which must also be met during the operation of the rolling line. The secondary conditions can be defined in the usual manner and comprise e.g. adjustment limits of the control elements, dynamic limits when readjusting the control elements, etc.

The object is further achieved using a non-transitory computer program, wherein the execution of the non-transitory computer program causes the control system to operate the rolling line in accordance with an operating method according to the invention.

The object is further achieved by using a control system, wherein the control system is programmed by a computer program according to the invention, so that it operates the rolling line in accordance with an operating method as per the invention.

The object is further achieved by a rolling line which has a control system which is designed according to the invention.

BRIEF DESCRIPTION OF THE DRAWINGS

The properties, features and advantages described above in respect of this invention, and the manner in which these are achieved, are clearer and easier to understand in the context of the following description of the exemplary embodiments explained in greater detail with reference to the schematic illustrations in the drawings, in which.

DESCRIPTION OF THE EMBODIMENT VARIANTS

Figure 1:
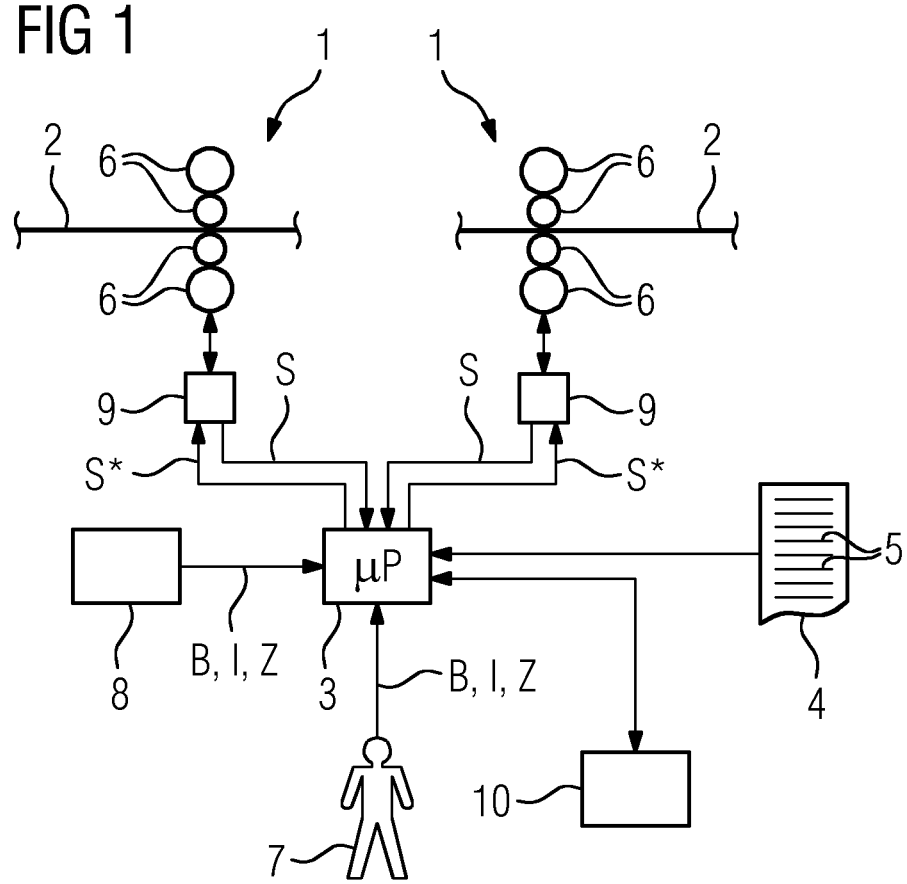
FIG. 1 shows a rolling line.

According to FIG. 1, a rolling line has a number of roll stands 1 of which two are shown. A minimum of a single roll stand 1 is present. However, a plurality of roll stands 1 are present in many cases, e.g. four to eight roll stands 1, and in particular five, six or seven roll stands 1. A flat rolling material 2 is rolled by means of the roll stands 1. The flat rolling material 2 is usually a strip. However, it can also be a heavy plate. A strip can have a finite length. Alternatively, the strip can be an endless strip.

The rolling line also has a control system 3. The control system 3 controls the rolling line, in particular the roll stands 1. The control system 3 is designed as a software-programmable control system. This is indicated in FIG. 1 by the symbol "μP" for "microprocessor" within the control system 3. The control system 3 is programmed by a non-transitory computer program 4. The computer program 4 comprises machine code 5 which can be executed by the control system 3. The programming of the control system 3 by the computer program 4 and the execution of the machine code 5 by the control system 3 causes the control system 3 to operate the rolling line in accordance with an operating method which is explained below with reference to FIG. 2.

Figure 2:
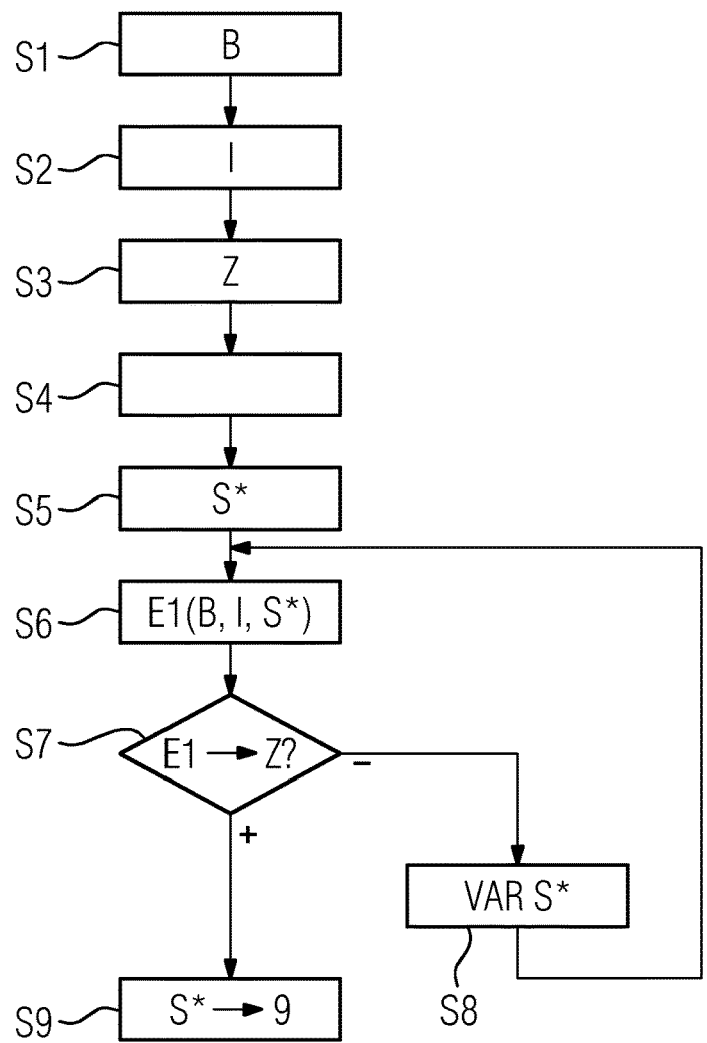
FIG. 2 shows a sequence diagram.

According to FIG. 2 and (see also FIG. 1), the control system 3 is initially provided with a description B of the rolling line in a step S1. The description B comprises the structural layout of the rolling line, i.e. the number of roll stands 1 and the geometry thereof. The description B further comprises the dynamic state of the rolling line, e.g. the temperature and the degree of wear of rolls 6 of the roll stands 1, in particular of working rolls of the roll stands 1. The description B can also comprise current control states of the roll stands 1. Furthermore, the description B comprises the possible activation states of the roll stands 1, i.e. the possible value range of the adjustment. The description B often also includes the dynamics of the control elements of the roll stands 1. The corresponding specifications for the description B are generally known to specialists.

The description B can be specified to the control system 3 by an operator 7. Equally, the description B can be specified to the control system 3 by a supervisory control system 8. Furthermore, the description B of the control system 3 can be partially specified by subordinate control systems 9 which control the individual roll stands 1. Mixed forms of these procedures are also possible.

In a step S2, the control system 3 receives actual variables I of the flat rolling material 2. The specification of the actual variables I can be effected by the operator 7 or by the supervisory control system 8. The actual variables I are actual variables of the flat rolling material 2, with which the flat rolling material 2 is supplied to the rolling line. They are therefore actual variables which relate to the state of the flat rolling material 2 before the rolling of the flat rolling material 2 in the rolling line. The actual variables I can comprise e.g. the temperature of the flat rolling material 2, its thickness d (see e.g. FIG. 3), its width b (see e.g. FIG. 3), its length, its chemical composition, etc. The temperature can be specified with spatial resolution in up to 3 dimensions (length direction, width direction, depth direction). The thickness can be specified in up to 2 dimensions (length direction and width direction). The spatial resolutions can be defined as required.

In a step S3, the control system 3 receives target variables Z. The target variables Z are variables of the flat rolling material 2, which the flat rolling material 2 should have after the rolling of the flat rolling material 2 in the rolling line. The specification of the target variables Z can be effected by the operator 7 or the supervisory control system 8.

In a step S4, the control system 3 implements a model 10 of the rolling line and parameterizes the model 10 based on the description B received in the step S1. The model 10 can be a model that is based on mathematical-physical equations. However, this is not absolutely necessary. It is however essential that the model 10 interrelates the actual variables I, the target variables Z, and desired values S* for control variables S for the roll stands 1, by means of which the roll stands 1 are influenced during the rolling of the rolling material 2.

In a step S5, the control system 3—provisionally—sets the desired values S* for the control variables S for the roll stands 1 of the rolling line. In a step S6, the control system 3 determines expected values E1 based on the actual variables I and the valid desired values S* for the control variables S, using the model 10 that was parameterized in the step S4. The expected values E1 are variables of the flat rolling material 2 which are expected for the flat rolling material 2 after the rolling in the rolling line, assuming that the flat rolling material 2 has the actual variables I before the rolling in the rolling line and is rolled in the rolling line according to the set desired values S*. The expected values E1 correspond to the target values Z with regard to type. The following is an example, even if this example has nothing to do with the present invention: if one of the target values Z is an average thickness which the flat rolling material 2 should have after the rolling in the rolling line, one of the expected values E1 is also an average thickness which is expected for the flat rolling material 2 after the rolling in the rolling line.

In a step S7, the control system 3 compares the determined expected values E1 with the target values Z. In particular, the control system 3 tests in step S7 whether the desired values S* are set in such a way that the expected values E1 are aligned as far as possible with target variables Z. If further alignment is possible, the control system 3 switches over to a step S8. In the step S8, the control system 3 varies the desired values S* that have been set. The control system 3 then returns to the step S6. If however no further alignment is possible, the control system 3 switches over to a step S9. In the step S9, the control system 3 transfers the most recently set and now definitive desired values S* to the subordinate control systems 9.

The subordinate control systems 9 activate the roll stands 1 of the rolling line and/or their control elements accordingly. As a result, the flat rolling material 2 is rolled in the rolling line according to the transferred desired values S*. The control elements of the roll stands 1 are not illustrated in FIG. 1. They comprise in particular the roll adjustment of the respective roll stand 1 and additional control elements by means of which the contour of the flat rolling material 2 is influenced. For example, such control elements include roll bending, reverse displacement of correspondingly shaped working rolls or intermediate rolls in the direction of their roll axes, swiveling, so-called pair crossing, and location-dependent temperature control of the flat rolling material 2 or corresponding points of the working rolls locally over the width of the flat rolling material 2. One or more of these control elements can be deployed as required. The temperature control usually involves cooling, but may also involve heating in specific cases.

In terms of approach, the procedure in FIG. 2 is known from the prior art. The difference relative to the prior art lies in the target variables Z which the control system 3 receives in the context of the step S3. Accordingly, the steps S6 and S7 also differ, since in these steps likewise the target variables Z or expected values E1, whose type corresponds to that of the target variables Z, are determined or utilized. In particular, the target variables Z of the flat rolling material 2 comprise at least one freely selectable discrete characteristic variable K1 to K5, K2' to K4', K2" to K4" defining the contour K of the flat rolling material 2. If required, the target variables Z additionally, but not alternatively, include the contour K of the flat rolling material 2. This is explained in further detail below with reference to FIG. 3 and FIG. 4.

Figure 3:
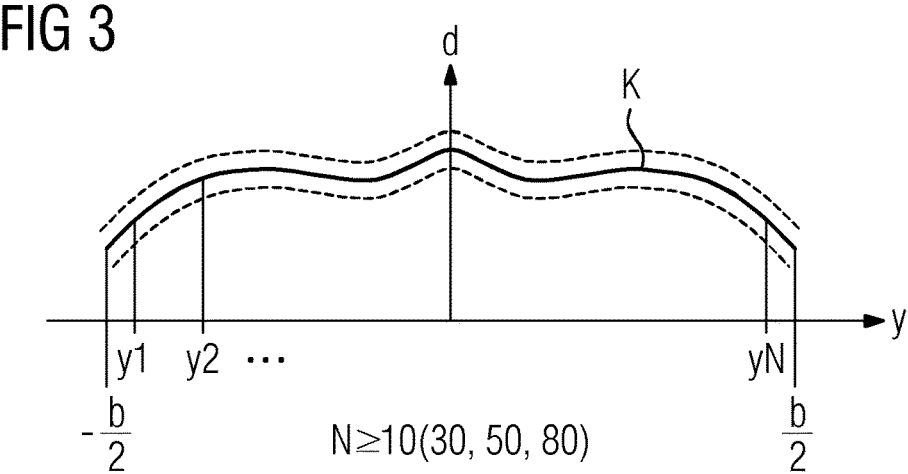
FIGS. 3 to 7 show a cross section of a flat rolling material in each case.

According to FIG. 3, the flat rolling material 2 has a width b. The thickness d of the flat rolling material 2 varies in a width direction y of the flat rolling material 2. The course of the thickness d as a function of the location in a width direction y is the contour K. This contour K can be specified directly to the control system 3 as a target variable Z. In this case, the contour K is specified directly or indirectly at N interpolation nodes y1, y2, etc. to yN as illustrated in FIG. 3. The number N of interpolation nodes y1, y2, etc. to yN should have a value of at least 10. The number N is preferably even significantly higher. For example, it can have a value of at least 30, at least 50 or even higher, e.g. at least 80. The contour K as such can be specified as it is. Alternatively, it is possible, as shown by the broken marked lines in FIG. 3, to additionally specify a permissible range, i.e. to not specify the contour K exactly, but to specify a range in which the contour K should lie.

Irrespective of whether or not the contour K is specified to the control system 3 as a target variable Z, at least one discrete characteristic variable K1 to K5, K2' to K4', K2" to K4" is nonetheless specified to the control system 3. It is possible for a plurality of discrete characteristic variables K1 to K5, K2' to K4', K2" to K4" to be specified to the control system 3. Alternatively, it is possible to specify only one discrete characteristic variable K1 to K5, K2' to K4', K2" to K4" to the control system 3. In either case, the operator 7 or the supervisory control system 8 has a "freedom of choice" as to which of the discrete characteristic variables K1 to K5, K2' to K4', K2" to K4" is or are specified to the control system 3. It is possible here likewise to specify upper and lower limits for the discrete characteristic variables K1 to K5, K2' to K4', K2" to K4", i.e. ranges in which the discrete characteristic variables K1 to K5, K2' to K4', K2" to K4" should lie.

Figure 4:
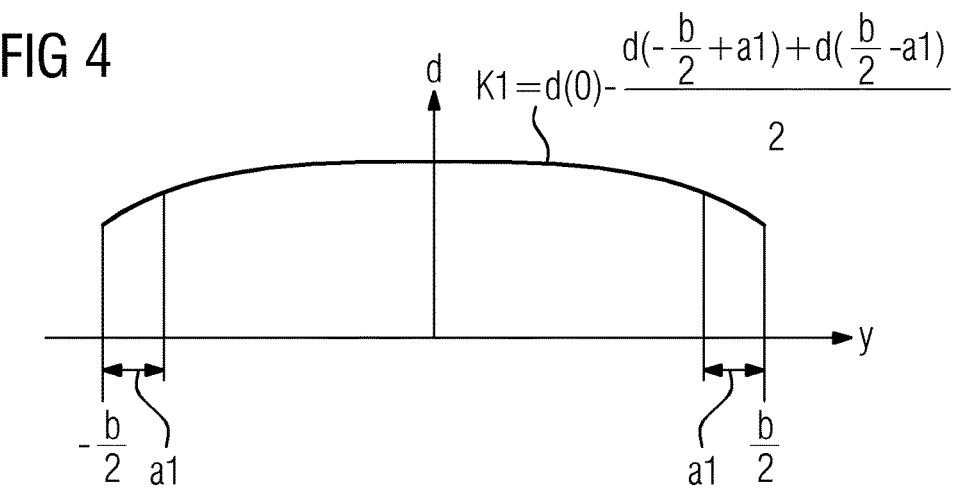

According to the illustration in FIG. 4, the discrete characteristic variable K1 is a profile value. The profile value K1 is a scalar. It designates the difference between the thickness d of the flat rolling material 2 in the center (y=0) of the flat rolling material 2 and the thickness d of the flat rolling material 2 at a defined distance a1 from the edges of the flat rolling material 2. Therefore if the flat rolling material 2 extends from −b/2 to +b/2, the location in a width direction of the flat rolling material 2 is designated as y, and the thickness d of the flat rolling material 2 at the location y is designated as d(y), the profile value K1 is given as:

$$K1 = d(0) - \frac{d(b/2 - a1) + d(-b/2 + a1)}{2} \quad (1)$$

The profile value K1 is therefore derived from the contour K at three points, specifically the thickness d in the center (y=0) and the average of the thickness d at a distance a1 from the two borders, i.e. at y=−b/2+a1 and y=b/2−a1. When specifying a profile value K1, it is also possible additionally to specify the distance a1 if applicable.

The profile value K1 is usually designated as Cxx in the prior art, where xx specifies the distance a1 from the borders of the flat rolling material 2 in millimeters. As a rule, the distance a1 is set to 25 mm or 40 mm. Accordingly, the corresponding profile values K1 are normally designated as C25 and C40 in the prior art. However, other values are also possible in principle.

Figure 5:
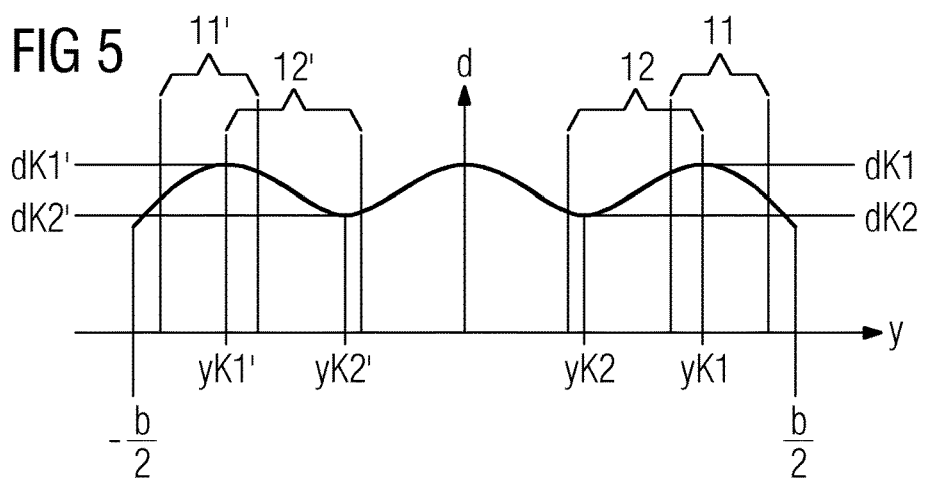

The discrete characteristic variables K2, K2', K2" relate to an edge value for a thick edge. According to the illustration in FIG. 5, the discrete characteristic variables K2 and K2' are defined as follows:

A region 11, 11' is first defined in the vicinity of each of the two edges of the flat rolling material 2. The two regions 11, 11' are symmetrical to each other relative to the center of the flat rolling material 2. The respective outer limit of the two regions 11, 11' is normally approximately 100 mm to 200 mm distant from the respective outer edge of the flat rolling material 2. As a rule, the width of the regions 11, 11' is likewise approximately 100 mm to 200 mm.

Within the regions 11, 11', the maximum dK1, dK1' of the thickness d, and the respectively associated point yK1, yK1' in a width direction y of the flat rolling material 2, are determined independently of each other in each case. A respective further region 12, 12' is then defined, starting from the two points yK1, yK1' in a width direction y of the flat rolling material 2 towards the center of the flat rolling material 2. As a rule, the width of the further regions 12, 12' is approximately 150 mm to 250 mm. Within the respective further region 12, 12', the minimum dK2, dK2' of the thickness d is then determined in each case. The respective point yK2, yK2' in a width direction y of the flat rolling material 2, at which the minimum dK2, dK2' of the thickness d occurs, is irrelevant.

The edge values K2 and K2' are then derived from the difference between the respective maximum dK1, dK1' and the respective minimum dK2, dK2':

$$K2 = dK1 - dK2 \quad (2)$$

$$K2' = dK1' - dK2' \quad (3)$$

The discrete variable K2" (a shared edge value K2") can be determined from the two edge values K2, K2'. In particular, the shared edge value K2" can be formed by means of averaging or using the minimum or the maximum of the two edge values K2, K2'. It is however also possible to determine and treat the two edge values K2, K2' independently of each other. It is moreover possible to limit the two edge values K2, K2' or the shared edge value K2" downwards to 0. It is also possible to supplement the two edge values K2, K2' or the shared edge value K2" with a location specification which is characteristic of the distance a2, a2' of the maximum dK1, dK1' from the edges of the flat rolling material 2 or from the edge of the flat rolling material 2.

The discrete characteristic variables K3, K3', K3" are dogbone values for a dogbone. The dogbone values K3 and K3' are defined in a similar manner to the edge values K2 and K2'. The difference is that, in the case of the dogbone values K3 and K3', it is not the respective minimum dK2, dK2' of the thickness d in the respective further region 12, 12', but the thickness d(0) in the center (y=0) of the flat rolling material 2 that is subtracted from the maximum dK1, dK1'. This is determined in the same way as in the case of the corresponding edge value K2, K2':

$$K3 = dK1 - d(0) \quad (4)$$

$$K3' = dK1' - d(0) \quad (5)$$

In a similar manner to the edge values K2 and K2', it is possible to determine and treat the two dogbone values K3, K3' independently of each other or to determine a shared dogbone value K3" as a discrete characteristic variable K3" from the two dogbone values K3, K3'. Furthermore, it is also possible here to supplement the dogbone values K3, K3' or the shared dogbone value K3" with a location specification which is characteristic of the distance a2, a2' of the maximum dK1, dK1' from the edges of the flat rolling material 2 or from the border of the flat rolling material 2.

Figure 6:
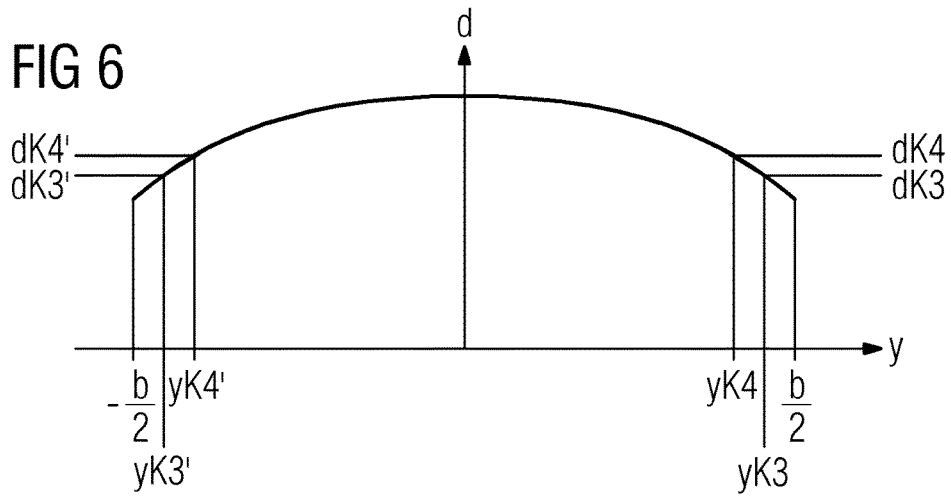

The discrete characteristic variable K4, K4', K4" is an edge drop value for an edge drop. The edge drop values K4 and K4' are defined as follows:

As illustrated in FIG. 6, a point yK3, yK3' is first defined in the vicinity of each of the two edges of the flat rolling material 2. The distance from the edges is normally between 50 mm and 150 mm. The two points yK3, yK3' are symmetrical to each other relative to the center of the flat rolling material 2. They are subsequently designated as outer points.

A further point yK4, yK4' is then defined in the vicinity of each of the two edges of the flat rolling material 2. The two further points yK4, yK4', subsequently designated as inner points, are situated further away from the edges of the flat rolling material 2 than the outer points yK3, yK3'. The two inner points yK4, yK4' are likewise symmetrical to each other relative to the center of the flat rolling material 2. The distance from the two outer points yK3, yK3' is normally between 100 mm and 200 mm.

The thickness dK3, dK3', dK4, dK4' of the flat rolling material 2 at the two outer and the two inner points yK3, yK3', yK4, yK4' is then ascertained. The respective edge drop value K4, K4' is derived from the difference between the thickness dK4, dK4' at the respective inner point yK4, yK4' and the thickness dK3, dK3' at the respective outer point yK3, yK3':

$$K4 = dK4 - dK3 \quad (6)$$

$$K4' = dK4' - dK3' \quad (7)$$

In a similar manner to the edge value K2, K2', it is also possible here to determine and treat the two edge drop values K4, K4' independently of each other, or to determine a shared edge drop value K4" as a discrete characteristic variable K4" from the two edge drop values K4, K4'.

Figure 7:
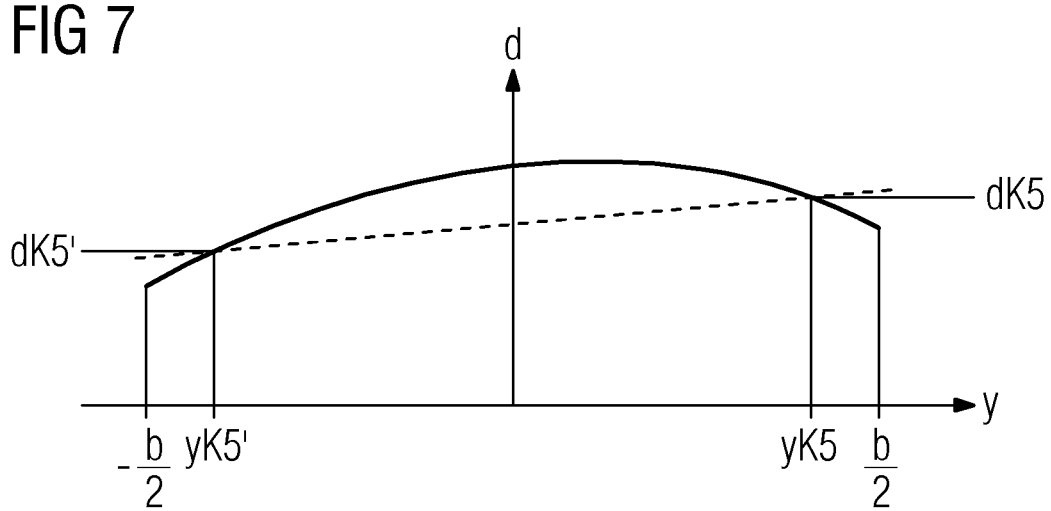

The discrete characteristic variable K5 is a taper value for a thickness taper. The taper value K5 can be defined in different ways. In each case, it is a measure of the asymmetry of the flat rolling material 2 viewed in a width direction y of the flat rolling material 2. According to the illustration in FIG. 7, for example, it is possible to define a point yK5, yK5' in the vicinity of each of the two edges of the flat rolling material 2. The two points yK5, yK5' are symmetrical to each other relative to the center of the flat rolling material 2. The distance to the two points yK5, yK5' is normally between 100 mm and 200 mm. The thickness dK5, dK5' of the flat rolling material 2 at these two points yK5, yK5' is then ascertained. The difference between the two thicknesses dK5, dK5' can be used as a taper value K5:

$$K5 = dK5 - dK5' \quad (8)$$

Alternatively, it is possible e.g. to determine the thickness d of the flat rolling material 2 in a width direction of the flat rolling material 2 at a multiplicity of interpolation nodes y1, y2, etc. to yN (cf. FIG. 3) and then to approximate the contour K thus defined by a straight line. The gradient of the straight line can be used as a taper value K5. It is also possible to multiply the gradient of the straight line thus determined with the width b of the flat rolling material 2 or a value that is slightly smaller than the width b of the flat rolling material 2, and thereby to determine a height difference which is then used as a taper value K5.

The inventive principle explained in the foregoing can be embodied in various ways.

Figure 8:
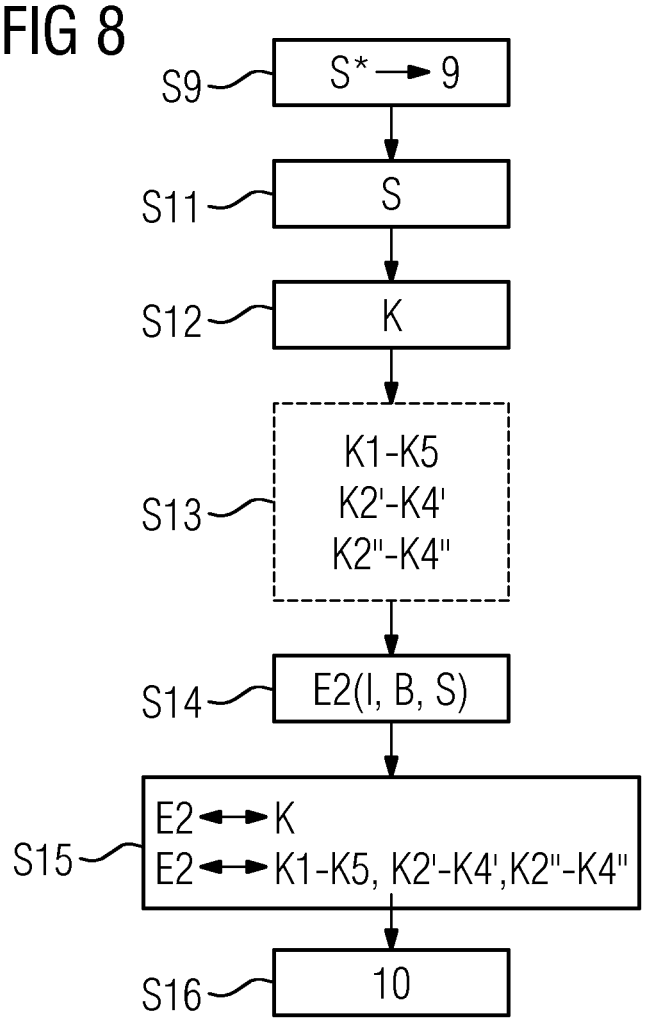
FIGS. 8 to 10 show a sequence diagram in each case.

According to the illustration in FIG. 8, for example, the control system 3 can capture the control variables S in a step S11 when rolling the flat rolling material 2. The control system 3 stores the control variables S in this case, so that they are available for subsequent evaluation.

In a step S12, the control system 3 is provided with the contour K of the flat rolling material 2. The contour K is the contour K of the flat rolling material 2 after the rolling of the flat rolling material 2 in the rolling line. The step S12 can comprise direct capture of the contour K using measurement technology. Alternatively, the control system 3 can determine the contour K on the basis of other captured variables. For example, this may be applicable or necessary if the contour K relates to a location of the rolling line at which the contour K cannot be captured using measurement technology.

In a step S13, the discrete characteristic variable K1 to K5, K2' to K4', K2" to K4" is determined, or the discrete characteristic variables K1 to K5, K2' to K4', K2" to K4" are determined, on the basis of the contour K.

In a step S14, based on the actual variables I of the flat rolling material 2 and the control variables S, the control system 3 re-determines expected values E2. As regards content, the step S14 corresponds to the step S5 from FIG. 2. The determination of the expected values I2 is therefore likewise effected using the model 10 of the rolling line. The difference is that the desired values S* which have been set for the control variables S are used to determine the expected values E1 in the step S5, whereas the control variables S, i.e. not the desired values S* but the actual values, are used to determine the expected values E2 in the step S14. However, the expected values E2 likewise represent variables which correspond to the target variables Z and are expected for the flat rolling material 2 after the rolling of the flat rolling material 2 in the rolling line.

In a step S15, the control system 3 compares the expected values E2 with the at least one discrete characteristic variable K1 to K5, K2' to K4', K2" to K4". A comparison with the contour K can additionally take place if applicable. As a function of the comparison, the control system 3 then corrects the model 10 of the rolling line in a step S16.

Figure 9:
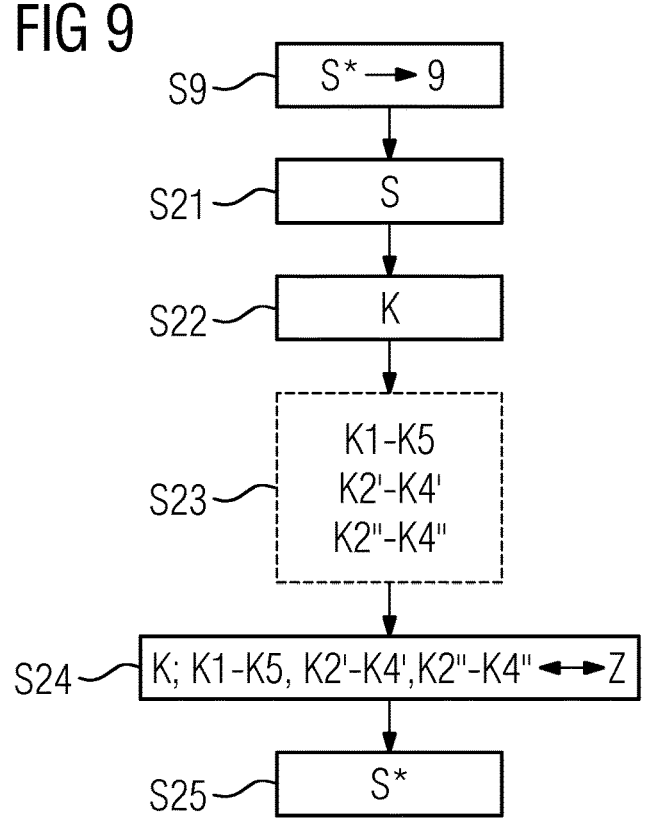

Alternatively or in addition to the embodiment according to FIG. 8, it is possible as in the illustration in FIG. 9 for the control system 3 to capture the control variables S in a step S21 when rolling the flat rolling material 2. The control system 3 can temporarily store the control variables S, so that they are available for subsequent evaluation. The duration of this temporary storage becomes apparent in the following explanations.

In a step S22, the control system 3 is provided with the contour K of the flat rolling material 2. The step S22 corresponds to the step S12 in terms of approach. The difference is merely that the step S22 is executed in relation to a previously rolled section of the flat rolling material 2, while another section of the flat rolling material 2 is still being rolled in the rolling line.

In a step S23, the discrete characteristic variable K1 to K5, K2' to K4', K2" to K4" is determined, or the discrete characteristic variables K1 to K5, K2' to K4', K2" to K4" are determined, on the basis of the contour K. The step S23 corresponds to the S13 from FIG. 8.

In a step S24 following thereupon, the control system 3 compares at least the at least one discrete characteristic variable K1 to K5, K2' to K4', K2" to K4", and possibly also the contour K of the flat rolling material 2, with the corresponding target variable Z or the corresponding target variables Z. On the basis of the comparison in the step S24, the control system 3 then corrects the desired values S* for the control variables S for the roll stands 1 in a step S25.

If the control variables S are temporarily stored, it is possible to implement tracking in a conventional manner and, in the step S24, to utilize those control variables S which are valid for that section of the flat rolling material 2 whose contour K was captured in the step S22. Although the procedure from FIG. 9 is associated with a relatively significant time delay in this case, it can be executed relatively accurately. Otherwise, it is necessary to utilize the control variables S momentarily captured in the step S21. This results in a similar time delay but reduced accuracy. It is nonetheless possible in this way to correct at least errors which persist for an extended period.

It may be applicable in some circumstances to limit the correction of the desired values S* for the control variables S to that roll stand 1 in which the flat rolling material 2 was last rolled before the contour K was captured. In particular, the dynamics can be optimized thereby.

For the purpose of determining the desired values S* for the control variables S of the roll stands (see step S7 from FIG. 2), the control system 3 can configure the step S7 in particular as explained below with reference FIG. 10.

Figure 10:
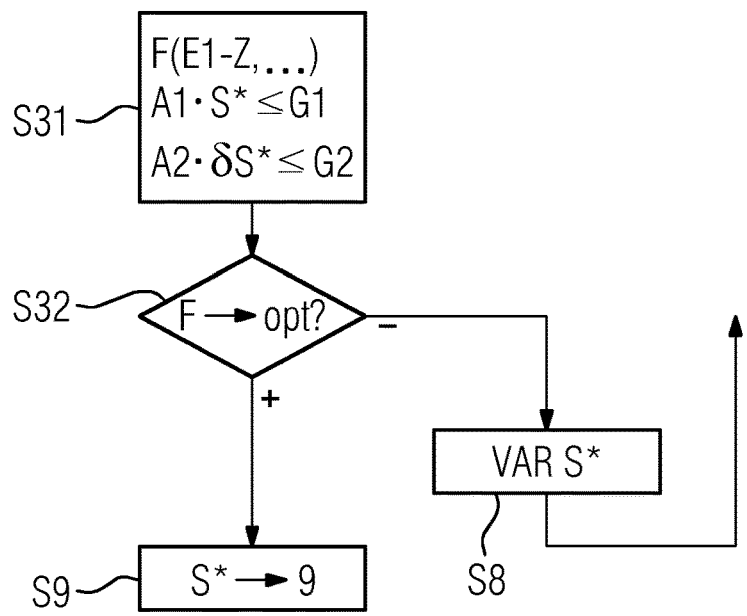

According to FIG. 10, the control system 3 determines a cost function F in a step S31. At least the deviation of the expected values E1 determined in the step S6 from the target variables Z is entered into the cost function F as in the illustration in FIG. 10. The target variables Z comprise at least values for at least one discrete characteristic variable K1 to K5, K2' to K4', K2" to K4", and possibly also for the contour K. Furthermore, the target variables Z can also specify other conditions to be taken into consideration, e.g. the thickness d and/or the flatness of the rolling material 2 after the rolling in the rolling line. Furthermore, further terms can also be entered into the cost function F, wherein said further terms are usually defined as penalty terms. The penalty terms may include e.g. a deviation of the desired values S* of the control variables S from average values. They can also include a speed at which the desired values S* of the control variables S change. The control system 3 determines the desired values S* by optimizing the cost function F, i.e. by attempting to determine a minimum or maximum value for the cost function F in the step S32 (in conjunction with the step S8 from FIG. 2).

When determining the desired values S* for the control variables S, the control system 3 preferably takes into consideration secondary conditions which must be met during the operation of the rolling line. Examples of such secondary conditions include in particular the adjustment limits and maximum possible readjustment speeds of the control elements of the roll stands 1, by means of which the contour K or the rolling material 2 generally can be influenced.

The present invention has many advantages. In particular, by virtue of the basic principle of the present invention, it is already possible to determine the desired values S* for the control variables S in such a way that a desired contour K—defined by the discrete characteristic variables K1 to K5, K2' to K4', K2" to K4"—can reliably be achieved. By virtue of the subsequent calculation according to FIG. 8 or the online adaption according to FIG. 9, an even greater improvement can be achieved.

LIST OF REFERENCE SIGNS

1 Roll stands
2 Flat rolling material
3 Control system
4 Computer program
5 Machine code
6 Rolls
7 Operator
8 Supervisory control system
9 Subordinate control systems
10 Model
11, 11' Regions
12, 12' Further regions
a1, a2, a2' Distances
b Width of the flat rolling material
B Description of the rolling line
d Thickness of the flat rolling material
dK1, dK1' Maxima of the thickness d
dK2, dK2' Minima of the thickness d
dK3 to dK5, Thicknesses
dK3' to dK5'
E1, E2 Expected values
F Cost function
I Actual variables of the flat rolling material
K Contour
K1 to K5, Discrete characteristic variables
K2' to K4',
K2" to K4"
N Number of interpolation nodes
S Control variables
S* Desired values for the control variables
S1 to S32 Steps
y Width direction
y1 to yN Interpolation nodes
yK1 to yK5, Points in a width direction
yK1' to yK5'
Z Target variables of the flat rolling material

The invention claimed is:

1. An operating method for a rolling line wherein the rolling line comprises a number of roll stands for rolling a flat rolling material, the method comprising:
  providing a control system operable for controlling the rolling line;
  prior to the rolling of the flat rolling material in the rolling line, the control system of the rolling line receiving actual variables (I) of the flat rolling material before the rolling of the flat rolling material in the rolling line and receiving target variables (Z) of the flat rolling material after the rolling of the flat rolling material in the rolling line, where the target variables (Z) comprise a plurality of discrete characteristic variables that define a contour (K) of the flat rolling material, the discrete characteristic variables comprising at least a profile value (K1), and at least one edge value (K2, K2', K2") for a thick edge, or at least one dogbone value (K3, K3', K3") for a dogbone, or at least one edge drop value (K4, K4', K4") for an edge drop, or at least one taper value (K5) for a thickness taper;

prior to the rolling of the flat rolling material in the rolling line, the control system determining desired values (S*) for control variables (S) for the roll stands of the rolling line, based on the actual variables (I) of the flat rolling material and the target variables (Z) of the flat rolling material, in combination with a description (B) of the rolling line which uses a model of the rolling line;

the control system determining the desired values (S*) for the control variables (S) in such a way that expected variables (E1) for the flat rolling material after the rolling of the flat rolling material in the rolling line are aligned as much as possible with the target variables (Z);

the control system transferring the desired values (S*) to the roll stands of the rolling line, such that the flat rolling material will be rolled in the rolling line according to the transferred desired values (S*);

rolling the flat rolling material in the rolling line using the transferred desired values (S*);

the control system capturing values of the control variables (S) during rolling the flat rolling material;

after the rolling of the flat rolling material, the control system capturing, or determining contour (K) of the rolled material on the basis of the captured control variables (S);

after the rolling of the flat rolling material, determining at least one discrete characteristic variable (K1 to K5, K2' to K4', K2" to K4") for the rolled material from the captured or determined contour (K) of the rolled material;

the control system re-determining expected variables (E2) based on the actual variables (I) of the flat rolling material and the captured control variables (S) by using the model of the rolling line for the flat rolling material;

the control system comparing the re-determined expected variables (E2) with the at least one discrete characteristic variable (K1 to K5, K2' to K4', K2" to K4") defining the captured or determined contour of the rolled material; and the control system correcting the model of the rolling line on the basis of the comparison.

2. The operating method as claimed in claim 1, further comprising:

during the rolling of the flat rolling material, the control system capturing or determining on the basis of captured variables, the at least one discrete characteristic variable (K1 to K5, K2' to K4', K2" to K4") for previously rolled sections of the flat rolling material;

the control system comparing the at least one discrete characteristic variable (K1 to K5, K2' to K4', K2" to K4") with the target variables (Z); and the control system correcting the desired values (S*) for the control variables (S) for the roll stands on the basis of the comparison.

3. The operating method as claimed in claim 1, further comprising:

the control system determining the desired values (S*) for the control variables (S) by optimizing a cost function (F), into which is entered a deviation of the expected variables (E1) for the flat rolling material after the rolling of the flat rolling material in the rolling line from the target variables (Z) of the flat rolling material.

4. The operating method as claimed in claim 3, further comprising:

when determining the desired values (S*) for the control variables (S), the control system taking into consideration limitations of the control elements which also are to be met during the operation of the rolling line.

5. A computer program product comprising a non-transitory computer program which can be executed by a control system for a rolling line for rolling a flat rolling material, wherein the execution of the machine code by the control system causes the control system to operate the rolling line in accordance with an operating method as claimed in claim 1.

6. A control system for a rolling line for rolling a flat rolling material, wherein the control system comprises a software-programmable control system and is programmed by a non-transitory computer program comprising machine code which can be executed by a control system for a rolling line for rolling a flat rolling material, wherein the execution of the machine code by the control system causes the control system to operate the rolling line, such that the system operates the rolling line in accordance with an operating method as claimed in claim 1.

7. A rolling line for rolling a flat rolling material,
wherein the rolling line has a plurality of the roll stands by means of which the flat rolling material is rolled; and
the rolling line has a control system as claimed in claim 6.

8. The operating method as claimed in claim 1, wherein the at least one edge value is derived from a difference between a respective maximum thickness of the flat rolling material and a respective minimum thickness of the flat rolling material, wherein the at least one dogbone value is determined by subtracting a center thickness of the flat rolling material from the maximum thickness of the flat rolling material, wherein the at least one edge drop value is derived from the difference between the thickness of the flat rolling material at a respective inner point and the thickness of the flat rolling material at a respective outer point, and wherein at least one taper value is a measure of the asymmetry of the flat rolling material.

* * * * *